US009535808B2

(12) United States Patent
Bates et al.

(10) Patent No.: US 9,535,808 B2
(45) Date of Patent: Jan. 3, 2017

(54) SYSTEM AND METHODS FOR AUTOMATED PLANT ASSET FAILURE DETECTION

(71) Applicants: Alexander B. Bates, San Diego, CA (US); Paul Rahilly, San Diego, CA (US); Scott Macnab, San Diego, CA (US)

(72) Inventors: Alexander B. Bates, San Diego, CA (US); Paul Rahilly, San Diego, CA (US); Scott Macnab, San Diego, CA (US)

(73) Assignee: Mtelligence Corporation, San Diego, CA (US)

( * ) Notice: Subject to any disclaimer, the term of this patent is extended or adjusted under 35 U.S.C. 154(b) by 73 days.

(21) Appl. No.: 14/217,265

(22) Filed: Mar. 17, 2014

(65) Prior Publication Data

US 2014/0351642 A1 Nov. 27, 2014

Related U.S. Application Data

(60) Provisional application No. 61/802,293, filed on Mar. 15, 2013.

(51) Int. Cl.
G06F 11/30 (2006.01)
G06F 11/22 (2006.01)
G06F 11/07 (2006.01)
G05B 23/02 (2006.01)

(52) U.S. Cl.
CPC ....... G06F 11/2257 (2013.01); G05B 23/0229 (2013.01); G06F 11/0709 (2013.01)

(58) Field of Classification Search
CPC .................. G06F 11/008; G06F 2201/81
USPC ..................................... 714/26, 47.3
See application file for complete search history.

(56) References Cited

U.S. PATENT DOCUMENTS

| 5,923,834 | A | * | 7/1999 | Thieret | G03G 15/55 399/8 |
| 7,181,370 | B2 | * | 2/2007 | Furem | E02F 9/205 701/50 |
| 7,509,537 | B1 | * | 3/2009 | Jensen | G05B 23/0229 714/47.2 |
| 2005/0083196 | A1 | * | 4/2005 | Furem | E02F 9/205 340/539.16 |
| 2005/0143956 | A1 | * | 6/2005 | Long | G05B 19/4065 702/184 |
| 2007/0139211 | A1 | * | 6/2007 | Pessin | E21B 47/0008 340/679 |
| 2009/0125755 | A1 | * | 5/2009 | Herscovitz | G06F 21/567 714/15 |
| 2010/0083049 | A1 | * | 4/2010 | Miki | G06F 1/28 714/38.13 |

(Continued)

Primary Examiner — Chae Ko
(74) Attorney, Agent, or Firm — Hamilton, Brook, Smith & Reynolds, P.C.

(57) ABSTRACT

A system for performing failure signature recognition training for at least one unit of equipment. The system includes a memory and a processor coupled to the memory. The processor is configured by computer code to receive sensor data relating to the unit of equipment and to receive failure information relating to equipment failures. The processor is further configured to analyze the sensor data in view of the failure information in order to develop at least one learning agent for performing failure signature recognition with respect to the at least one unit of equipment.

20 Claims, 15 Drawing Sheets

(56) References Cited

U.S. PATENT DOCUMENTS

| | | | | |
|---|---|---|---|---|
| 2010/0101785 A1* | 4/2010 | Khvoshchev | ............ | E21B 34/16 |
| | | | | 166/250.01 |
| 2010/0256794 A1* | 10/2010 | McLaughlin | ...... | G05B 19/4183 |
| | | | | 700/110 |
| 2011/0033122 A1* | 2/2011 | Le Roux | .................. | G06K 9/62 |
| | | | | 382/226 |
| 2011/0224947 A1* | 9/2011 | Kriss | ..................... | F24F 3/1603 |
| | | | | 702/179 |
| 2012/0283963 A1* | 11/2012 | Mitchell | ................ | F01D 17/02 |
| | | | | 702/34 |
| 2014/0188777 A1* | 7/2014 | Yan | ........................ | G06F 11/30 |
| | | | | 706/50 |

\* cited by examiner

SYSTEM AND METHODS FOR AUTOMATED PLANT ASSET FAILURE DETECTION

CROSS REFERENCE TO RELATED APPLICATIONS

This application claims priority to and the benefit of U.S. Provisional Patent Application No. 61/802,293, entitled SYSTEMS AND METHODS FOR AUTOMATED PLANT ASSET FAILURE DETECTION, filed Mar. 15, 2013, the disclosure of which is incorporated herein by reference in its entirety for all purposes. The present application is related to commonly owned and assigned U.S. patent application Ser. No. 11/740,404, entitled "System and Methods for the Universal Integration of Plant Floor Assets and a Computerized Management System," which is incorporated herein by reference in its entirety for all purposes.

FIELD

The systems and methods disclosed herein relate to preventing failure in industrial equipment and other plant assets.

BACKGROUND

Large manufacturers today face extreme margin pressures from low-cost producers, rising energy costs, and regulatory and environmental restrictions. The need to improve asset performance is very great. One barrier to improvement has been the absence of a performance management solution encompassing the various divisions of operations, maintenance, and finance, for example. With each division using its own performance metrics, it is difficult for optimal decisions to be made, such as balancing reliability goals against asset utilization goals.

Many people have been chasing the "holy grail" of self-diagnostics. Furthermore, there are many balanced scorecards and key performance indicator solutions being offered in today's market. Many seem to be making similar claims including that their product will make a manufacturing process run better, faster, more efficiently, and with greater returns. However, one of the greatest challenges for effectively improving plant asset performance is that the necessary information is scattered across disconnected silos of data in each department. Furthermore, it is difficult to integrate these silos due to several fundamental differences. For example, control system data is real-time data measured in terms of seconds, whereas maintenance cycle data is generally measured in terms of calendar based maintenance (e.g., days, weeks, months, quarters, semi-annual, annual), and financial cycle data is measured in terms of fiscal periods. Furthermore, different vendors of various equipment and enterprise systems tend to have their own set of codes (e.g., status codes) and are non compliant with any universal standard.

Manufacturers are drowning in a flood of real-time and non-real time data and are losing revenues at the same time. Therefore, there is a growing call for a manufacturing intelligence solution that makes use of the enormous amount of data in an intelligent manner.

Further limitations and disadvantages of conventional, traditional, and proposed approaches will become apparent to one of skill in the art, through comparison of such systems and methods with the systems and methods as set forth in the remainder of the present application with reference to the drawings.

SUMMARY

Exemplary embodiments of the present disclosure that are shown in the drawings are summarized below. These and other embodiments are more fully described in the Detailed Description section. It is to be understood, however, that there is no intention to limit the teachings of the disclosure to the forms described in this Summary or in the Detailed Description. One skilled in the art can recognize that there are numerous modifications, equivalents and alternative constructions that fall within the spirit and scope of the teachings of this disclosure.

Aspects of the disclosure relate to failure signature recognition for learning when failures take place by analyzing historical data and identifying signatures in the data indicative of coming failure. In addition, the disclosure pertains to anomaly detection for analyzing current data and comparing the current data to past data and one or more multivariate models developed based on the past data to identify non-normal or anomalous conditions.

In one aspect the disclosure relates to a computer program product including a non-transitory computer readable medium having code stored therein for causing a computer to perform failure signature recognition training for at least one unit of equipment. The code includes first code for causing the computer to receive sensor data relating to the unit of equipment and second code for causing the computer to receive failure information relating to equipment failures. Third code is provided for causing the computer to analyze the sensor data in view of the failure information in order to develop at least one learning agent for performing failure signature recognition with respect to the at least one unit of equipment.

In another aspect the disclosure relates to a computer program product including a non-transitory computer readable medium having code stored therein for causing a computer to perform equipment monitoring. The code includes first code for causing the computer to receive trend data relating to sensors of monitored equipment and second code for comparing the current trend data to known failure signatures for the monitored equipment. The code further includes third code for generating, based upon the comparing, an alarm condition with respect to at least one item of equipment within the monitored equipment wherein the alarm condition relates to a failure of the at least one item of equipment.

The disclosure also pertains to a computer program product including a non-transitory computer readable medium having code stored therein for causing a computer to perform operations relating to anomaly detection for at least one unit of equipment. The code includes first code for causing the computer to receive sensor data relating to the unit of equipment and second code for causing the computer to receive failure information relating to one or more equipment failures. The code also includes third code for causing the computer to analyze the sensor data over time periods other than periods encompassing the one or more equipment failures to determine one or more normal operating states of the at least one unit of equipment and fourth code for causing the computer to train an anomaly agent to detect an anomaly when a current operating state of the at least one unit of equipment is outside of the one or more normal operating states.

In a further aspect the disclosure pertains to a system for performing failure signature recognition training for at least one unit of equipment. The system includes a memory and a processor coupled to the memory. The processor is configured by computer code to receive sensor data relating to the unit of equipment and to receive failure information relating to equipment failures. The processor is further configured to analyze the sensor data in view of the failure information in order to develop at least one learning agent for performing failure signature recognition with respect to the at least one unit of equipment.

In yet another aspect the disclosure relates to a system for performing equipment monitoring. The system includes a memory and a processor coupled to the memory. The processor is configured by computer code to receive trend data relating to sensors of monitored equipment and perform a comparison of the current trend data to known failure signatures for the monitored equipment. The processor is further configured by the computer code to generate, based upon the comparison, an alarm condition with respect to at least one item of equipment within the monitored equipment wherein the alarm condition relates to a failure of the at least one item of equipment.

The disclosure also is directed to a system for performing operations relating to anomaly detection for at least one unit of equipment. The system includes a memory and a processor coupled to the memory. The processor is configured by the computer code to receive sensor data relating to the unit of equipment and receive failure information relating to one or more equipment failures. The processor is also configured to analyze the sensor data over time periods other than periods encompassing the one or more equipment failures to determine one or more normal operating states of the at least one unit of equipment. In addition, the processor is configured to train an anomaly agent to detect an anomaly when a current operating state of the at least one unit of equipment is outside of the one or more normal operating states.

As previously stated, the above-described embodiments and implementations are for illustration purposes only. Numerous other embodiments, implementations, and details of the teachings of the disclosure are easily recognized by those of skill in the art from the following descriptions and claims.

BRIEF DESCRIPTION OF THE DRAWINGS

Various objects and advantages and a more complete understanding of the present disclosure are apparent and more readily appreciated by reference to the following Detailed Description and to the appended claims when taken in conjunction with the accompanying Drawings wherein:

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
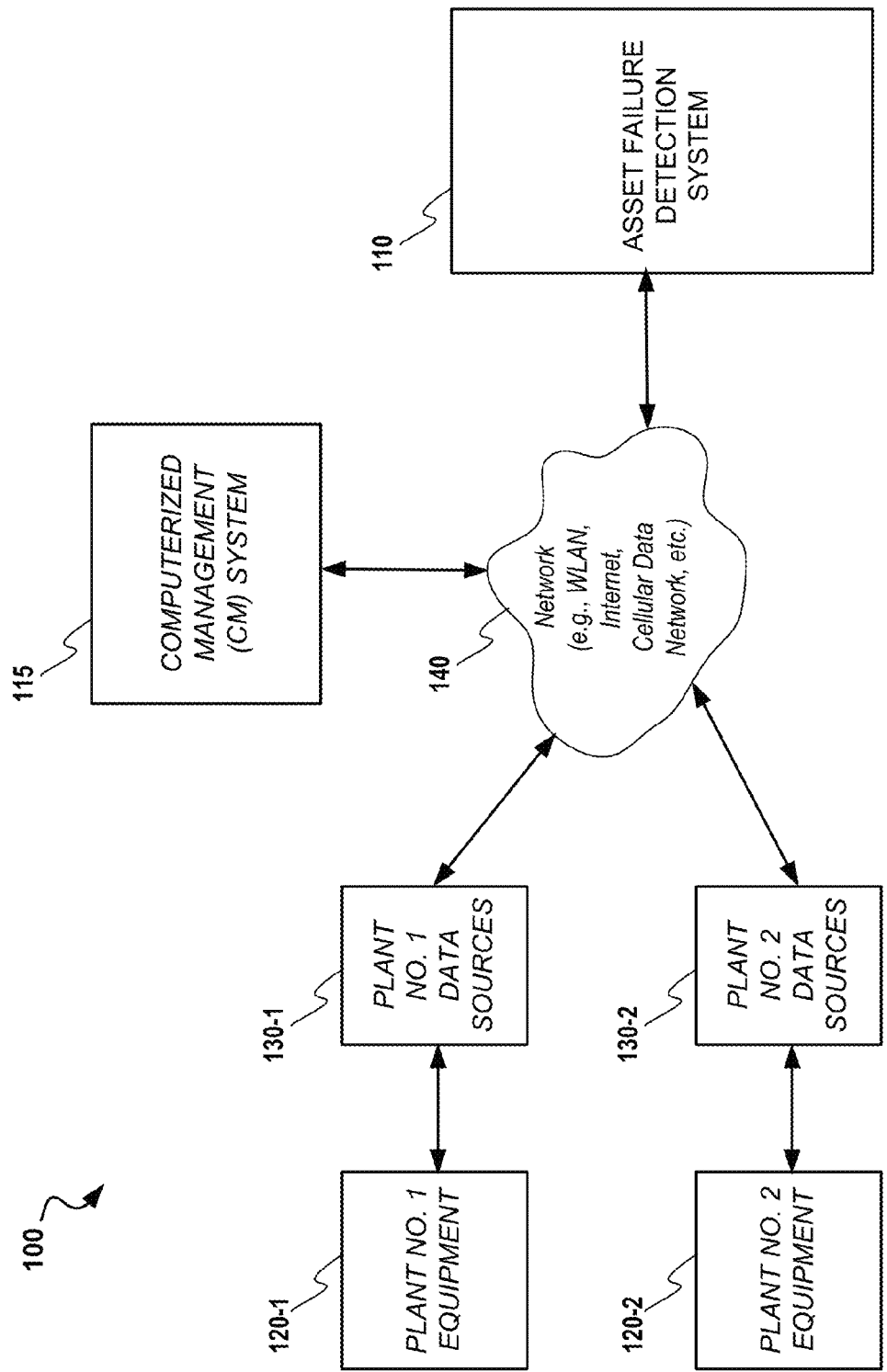
FIG. 1 depicts a block diagram of an exemplary system for performing asset failure detection in accordance with the disclosure.

Referring now to the drawings, where like or similar elements are designated with identical reference numerals throughout the several views, and referring in particular to FIG. 1, it illustrates a block diagram of an exemplary system 100 for performing asset failure detection in accordance with the disclosure. The system 100 includes an asset failure detection system 110, a computerized management (CM) system (also known as a computerized maintenance management system or CMMS), a first plant 120-1 with equipment coupled to first plant data sources 130-1, a second plant 120-2 with equipment coupled to second plant data sources 130-2 and a communication network (e.g., the Internet, a WLAN, a cellular data network or other communication network) communicatively coupling the other components of the system 100.

The asset failure detection system 110 is configured to receive sensor data from the first and second plant data sources 130-1 and 130-2. The asset failure detection system also receives notifications of equipment failures (e.g., work order histories, etc.) from the CM system 115. The failure notifications from the CM system 115 include indications of the types of failures, dates of failures, and failure codes. Using methods described below, the asset failure detection system 110 analyzes the sensor data received from the first and second plant data sources 130-1 and 130-2 in view of the equipment failure notifications received from the CM system 115 in order to develop learning agents to perform the failure signature recognition and anomaly detection methods described below. The CM system 115 is similar to systems described in commonly owned and assigned U.S. patent application Ser. No. 11/740,404, entitled "System and Methods for the Universal Integration of Plant Floor Assets and a Computerized Management System," which is incorporated in its entirety for all purposes.

The first and second plants 120-1 and 120-2 each include various plant equipment that is monitored by various sensors in the plant data sources 130-1 and 130-2 respectively. The first and second plant data sources each include a plant historian system (not shown) that stores Tag information related to sensors in the plant data sources 130.

For each plant 120, the CM system 115 stores data indicative of equipment hierarchy, equipment type (e.g., metadata defining equipment type, e.g., a centrifugal pump versus a non-centrifugal pump, but no Tag information) and work order histories for the plant equipment in the plants 120.

The asset failure detections system 115 enumerates Tags from the plant historian and matches these to the equipment types and hierarchy stored in the CM system 115. This enables multiple equipment of similar types to contribute to the failure history analysis performed at the asset failure detection system 115.

Figure 2:
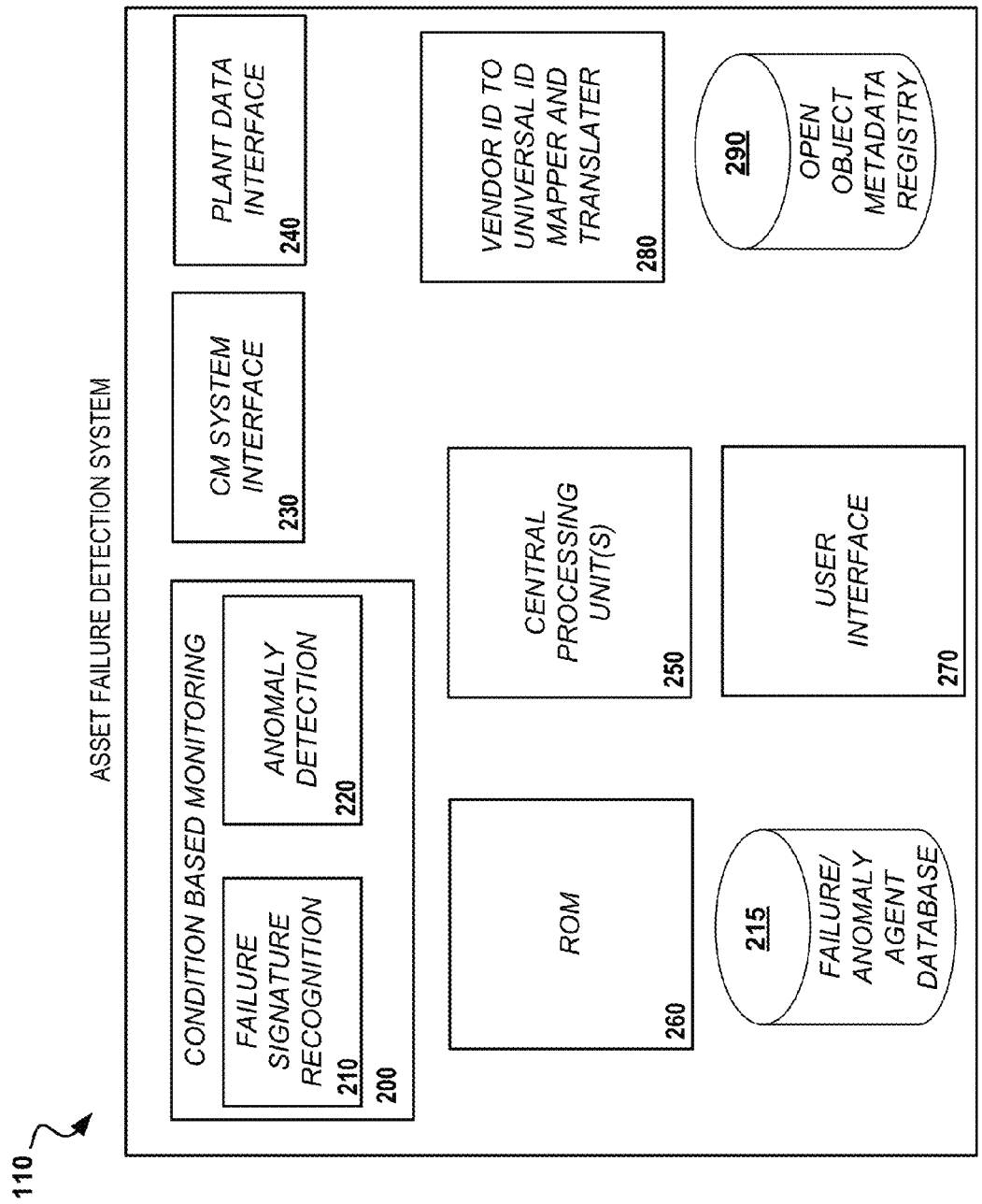
FIG. 2 depicts a block diagram of a platform for performing asset failure detection in the system of FIG. 1.

Referring to FIG. 2, an exemplary block diagram of an asset failure detection system 110 for performing asset failure detection in the system of FIG. 1 is shown. The asset failure detection system 110 can be a computer server or servers. The asset failure detection system 110 includes a condition based monitoring (CBM) subsystem 200 that includes a failure signature recognition component 210 and an anomaly detection component 220. The CBM system 200 is communicatively coupled to a plant data interface 240 which is in turn connected to the network 140 and to the plant data sources 120. This connection to the plant data sources 130 allows importation of sensor data from plant historians at the plant data sources 130. The sensor data is used to train learning agents for the failure signature recognition component 210 and the anomaly detection component 220.

The CBM subsystem 200 is also communicatively coupled to a CM system interface 230 that is connected to the network 140 and to the CM system 115. As is described below, the CBM subsystem 200 imports work order histories from the CM system 115 to use as part of the failure agent training for the failure signature recognition component 210 and anomaly agent training for the anomaly detection component 220. The failure and anomaly agents are stored in a failure agent and anomaly agent database 215 that includes one or more types of storage medium. The CBM subsystem 200 also manages changes in the plant equipment by monitoring the work order histories from the CM system 115 and the TAG identifiers associated with sensors of the plant data sources 130. In this way the CBM subsystem 200 is made aware of new equipment installed at the plant equipment sites 120. The CBM system 200 communicates new tag and equipment identifiers to a vendor ID to universal ID mapper and translator 280 (referred to herein as the ID mapper 280) which maps vendor IDs to universal IDs and stores these mappings in an open object metadata registry 290. The condition based monitoring system 200 continually polls the CM system 115 and plant data sources 130 for new data, new tags and new equipment. In one embodiment, the CBM subsystem 299 communicates with the plant data sources 130 and the CM system 115 using the Mimosa protocol.

The asset failure detection system 110 also includes one or more central processing units (CPUs) 250, a ROM (or Flash ROM or EEPROM) storage medium 260 for storing program code for execution by the one or more CPUs 250 to perform the processes described herein. A user interface module 270 is configured to output graphical user interfaces to display devices and receive input from input mechanisms of computing devices using the asset failure detection system 110.

The failure signature recognition component 210 uses pattern recognition techniques to learn when failures are about to occur. The failure signature recognition component identifies fault conditions in the work order histories of the CM system 110, takes the sensor data from the plant data sources and learns failure signatures based on the sensor data.

The anomaly detection component 220 is a forward looking analysis that pulls in past data and builds a multi-variate model as to what is normal. For example, the anomaly detections component 220 can look at temperature and pressure time histories and identify abnormal measurements based on trained learning agents. The anomaly detection component 220 can use machine learning as one approach for training. The learning agents of the anomaly detection component are trained to identify an anomaly in the sensor data before a failure occurs. If an anomaly is detected, the affected equipment can be shut down and inspected to identify what may be causing the anomaly before a catastrophic failure occurs.

Figure 3:
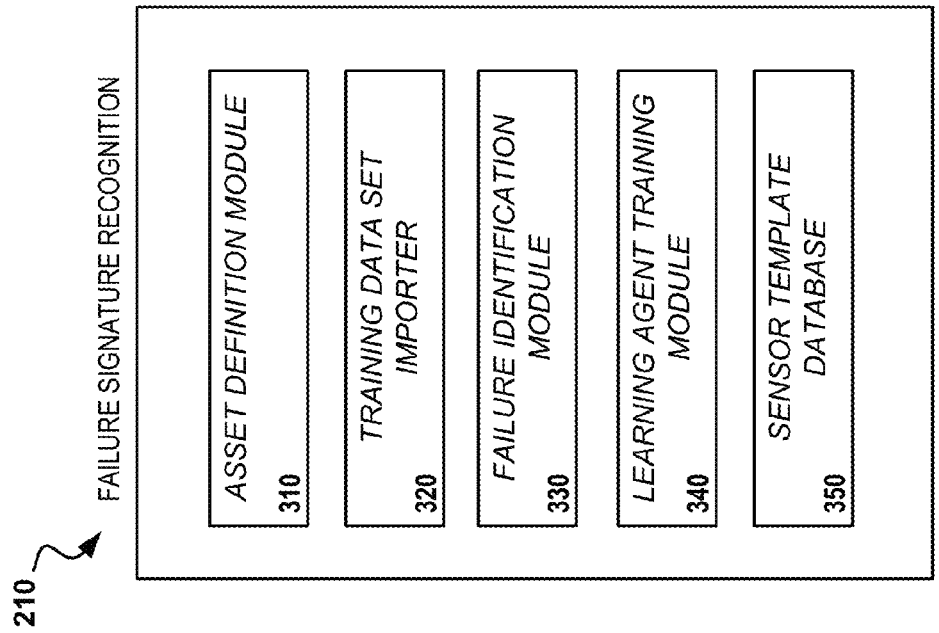
FIG. 3 depicts a block diagram of various functional modules used by a failure signature recognition subsystem in the asset failure detection platform of FIG. 2.

The failure signature recognition component 110 is made up of various functional modules as shown in FIG. 3. The functional modules in FIG. 3 are exemplary only and other embodiments can divide the functions differently. The functional modules of FIG. 3 include an asset definition module 310, a training set data importer 320, a failure identification module 330, a learning agent training module 340 and a sensor template database 350. The functions performed by these functional modules will be described in reference to the methods described herein.

Figure 4A:
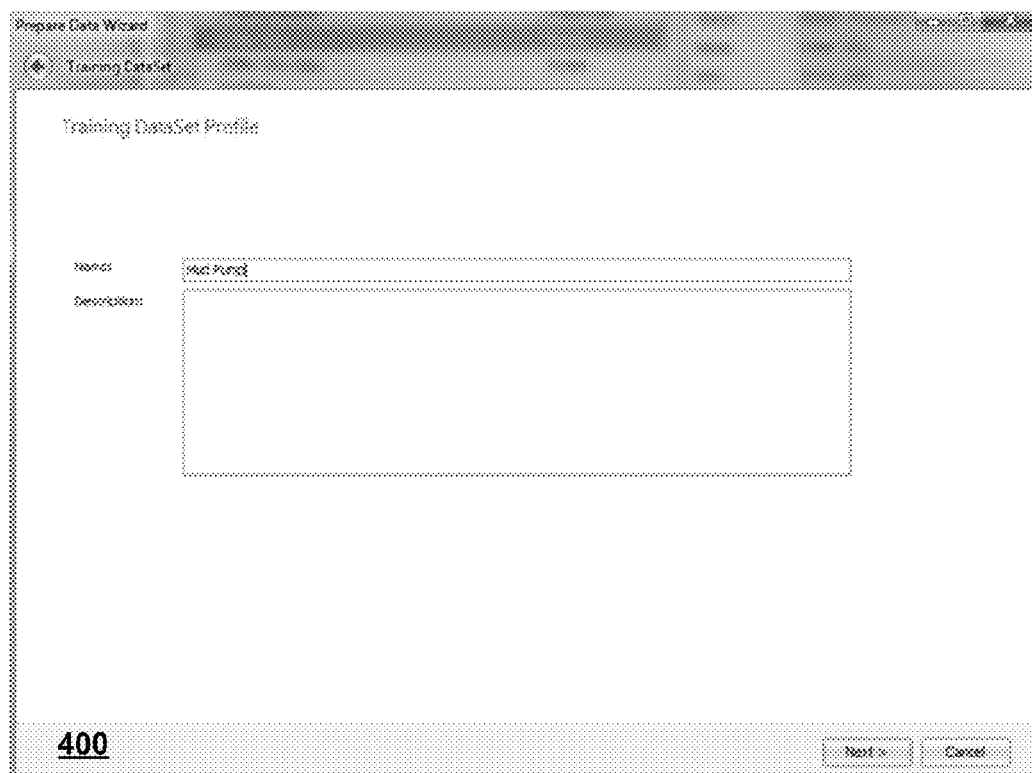
FIGS. 4A, 4B, 4C, 4D, 4E, 4F, 4G, 4H, 4I, 4J and 4K show screenshots of user interfaces provided by the asset failure detection platform of FIG. 2.
Figure 4B:
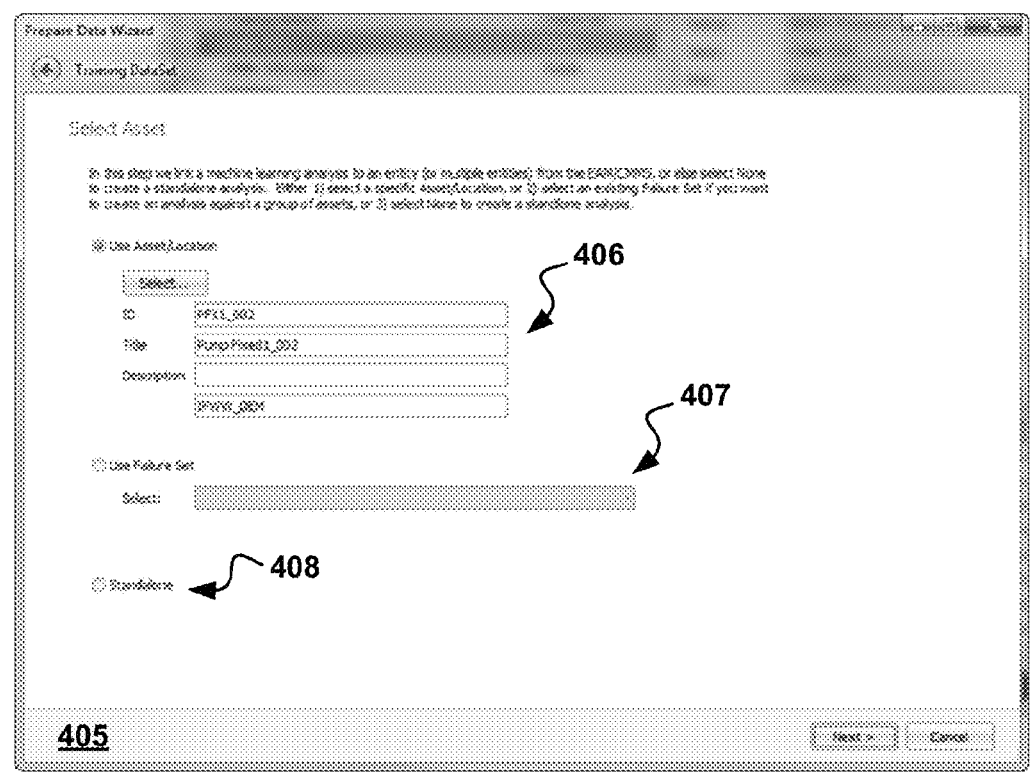
Figure 10:
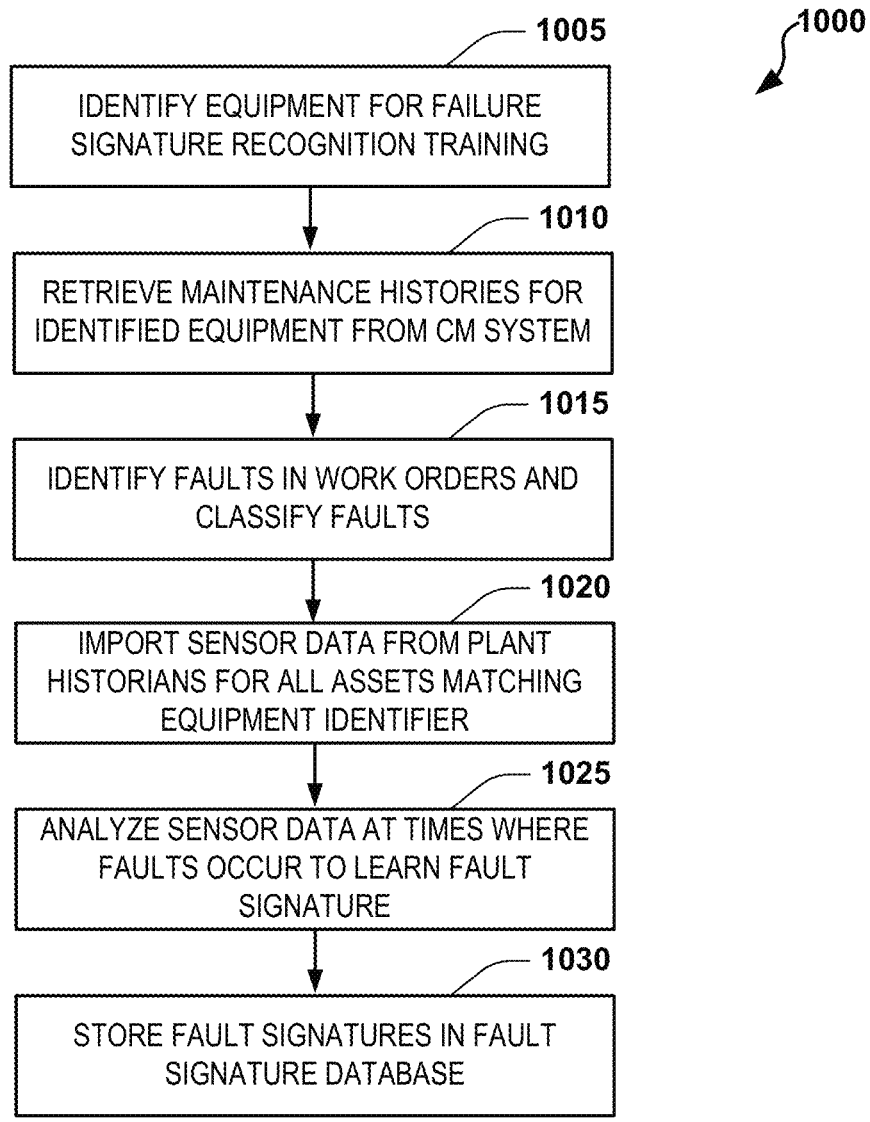
FIG. 10 illustrates a flowchart of an exemplary process for performing failure signature recognition training in accordance with the disclosure.

Referring to FIG. 10, a process 1000 for performing failure signature recognition training includes the stages shown. In reference to FIG. 10 with further reference to FIGS. 2 and 3, the process 1000 begins at stage 1005 where the asset definition module 310 receives an input identifying a piece of equipment for which failure signature recognition training is to begin. FIG. 4A shows a user interface screen 400 displayed by the user interface module 270 which a user can indicate a name of a piece of equipment. In FIG. 4A, the user has input the name "mud pump" into a name field. Upon entering the name "mud pump" into the name field, the user interface 270 renders a user interface screen 405 illustrated in FIG. 4B. The user interface screen 405 provides the user with three options for selecting an asset: (1) selecting a single asset 406 at a location; (2) select an existing Failure Set 407 if the user wants to create an analysis against a group of assets; and (3) select none to create a standalone analysis 408. In this example, the user enters an ID number identifying the specific pump at a specific location to be analyzed.

Figure 4C:
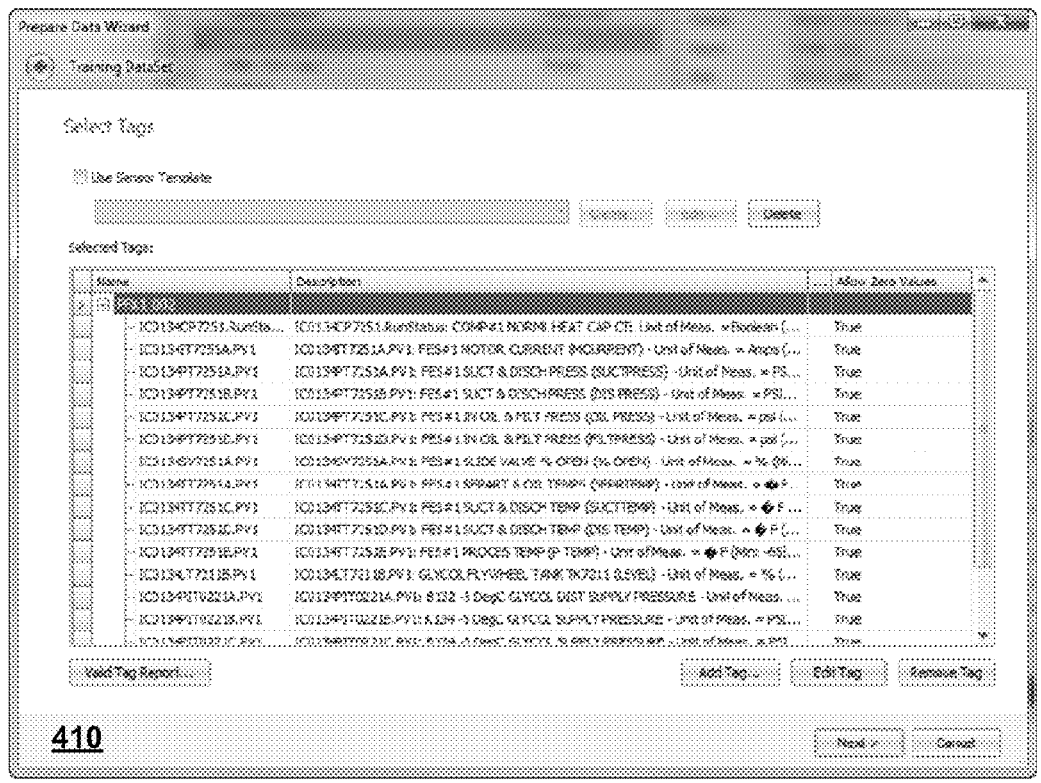
Figure 4D:
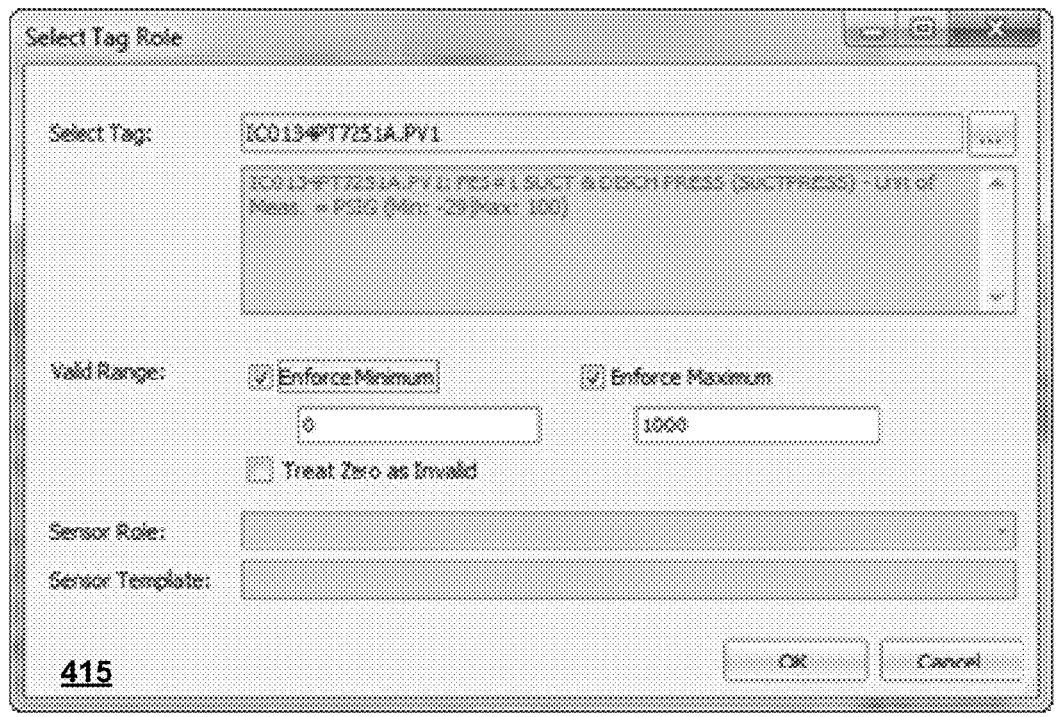

After the user selects the one or more assets (or no asset in the case of a standalone analysis), the user interface displays a user interface screen 410 as shown in FIG. 4C. The user can select from a list of tags listed in a tag data store shown in the screen 410. Each tag corresponds to a sensor associated with the pump selected with the screen 405 in this example. A sensor could be associated with an operating parameter of the pump such as pressure or temperature. For each tag in the screen 410, the user is provided with a screen 415 shown in FIG. 4D. The screen 415 allows the user to set outlier removal settings (minimum and maximum) to remove spurious data. If the received sensor data is outside of the minimum and maximum values input by the user, the sensor data is removed from the training data set.

Figure 4E:
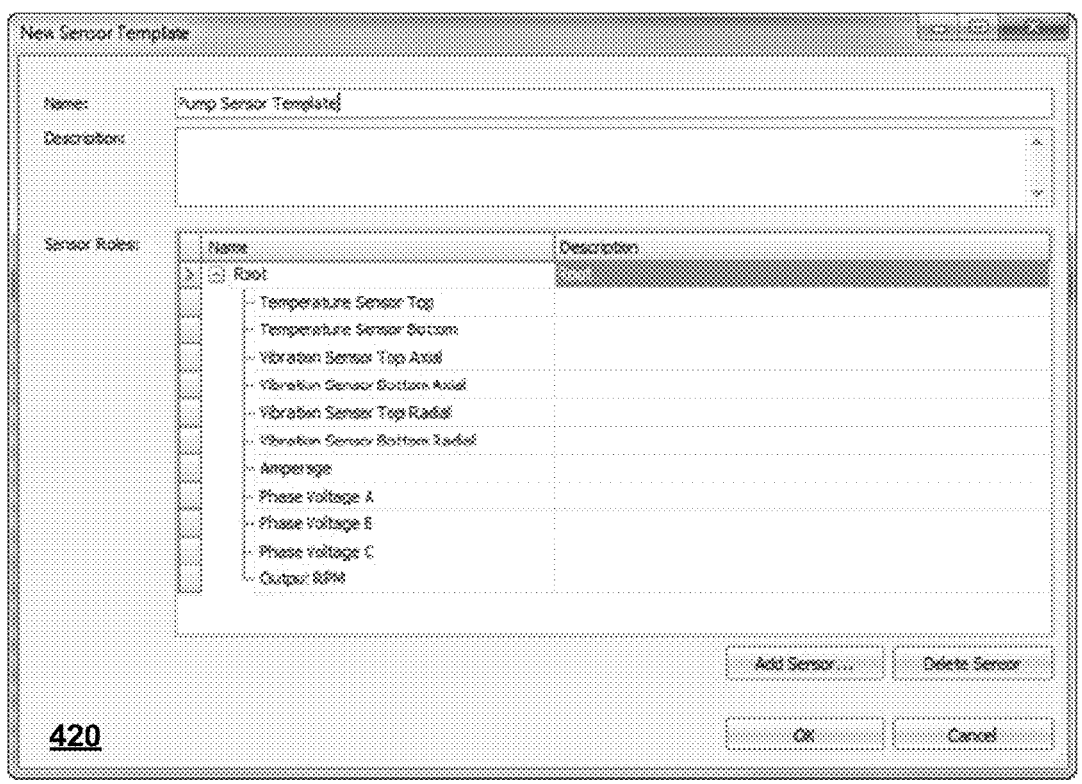

Upon setting all the outlier setting on the screen 415, the user interface 270 renders a user interface screen 420 shown in FIG. 4E. The screen 420 is used to create a sensor template for the chosen asset (the pump). Similar assets have similar sensors and can use the same template. Sensor templates are stored in the sensor template database 350.

Different assets could have a subset of the sensors listed on the sensor template. This embodiment uses similar assets to gather profile data for a population and learn from the population data. The sensor template is a framework, but the user customizes the templates. One user's piece of equipment will have different sensor, potentially, than another user's similar piece of equipment. The user can customize the templates such that specific sensors are mapped to the specific tags on a specific piece of equipment.

Figure 4F:
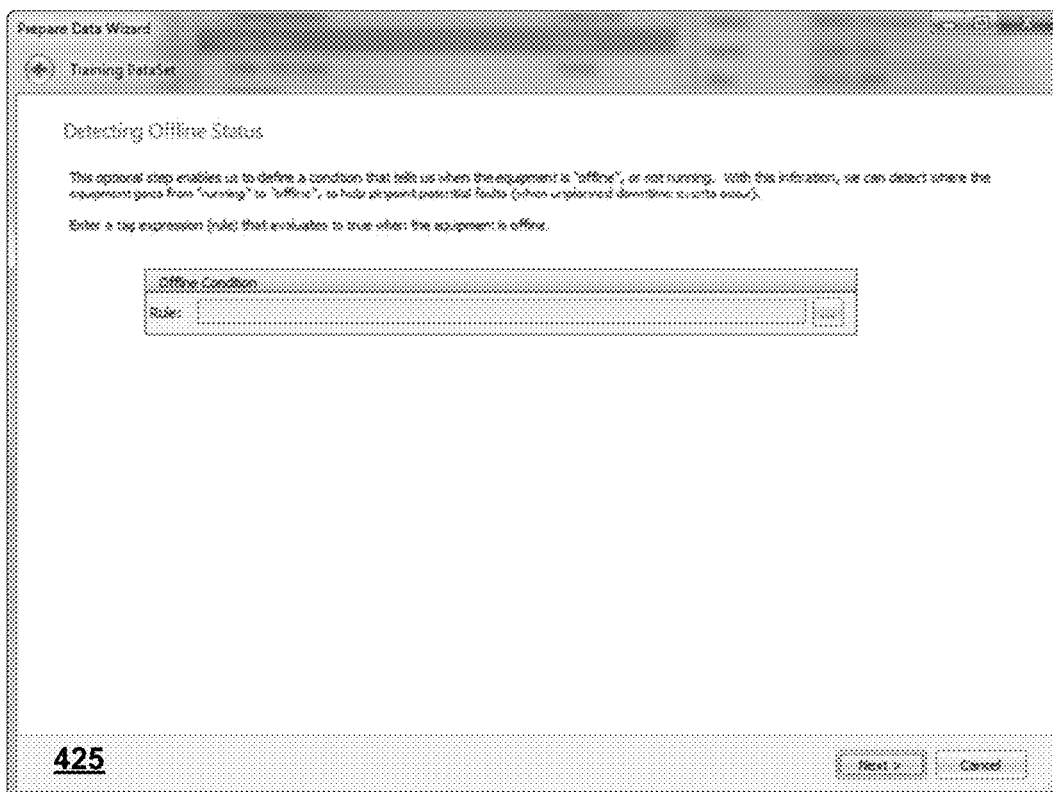

After completing the sensor template in screen 420, the user interface module 270 renders the user interface screen 425 shown in FIG. 4F. With screen 425, the user is asked to input a rule to detect offline status (e.g., based on amperage or a current flow). The offline status could be an indication of a potential failure. When an asset is detected as being offline, the sensor data is not used for failure signature recognition or anomaly detection. This completes the identification of the equipment at stage 1005.

Figure 4G:
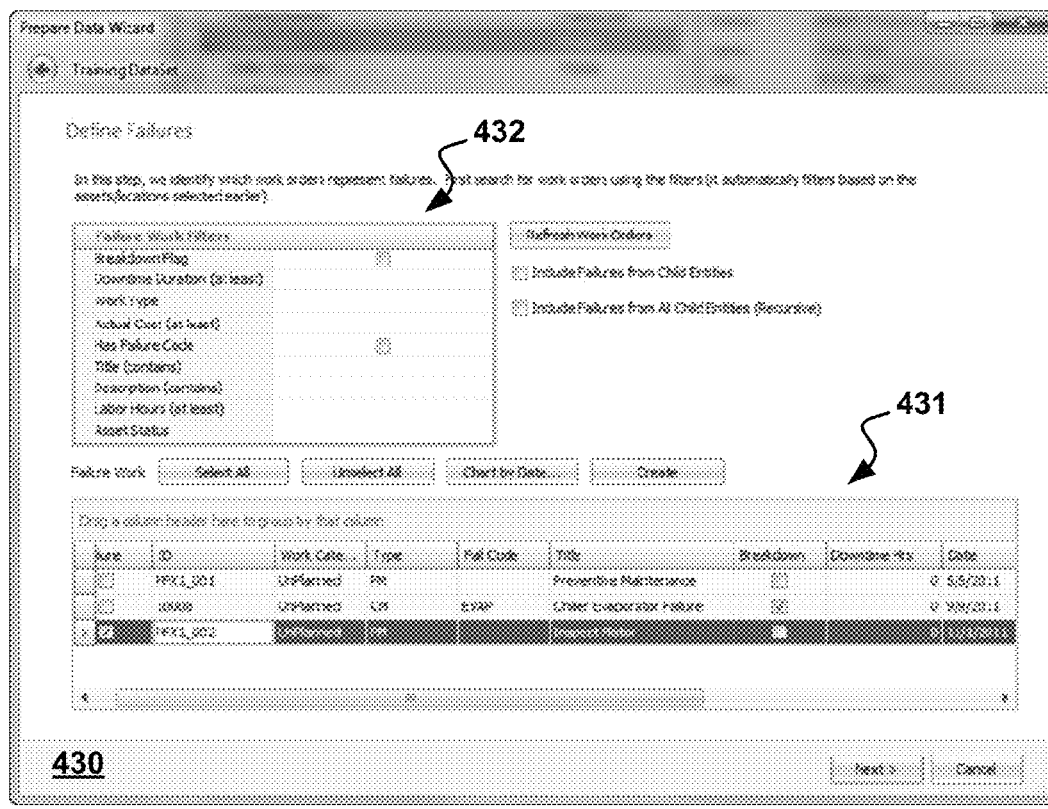

At stage 1010, the failure identification module 330 retrieves maintenance histories that have been previously obtained from the CM system 115. The failure identification module 330 provides a screen 430 shown in FIG. 4G, via the user interface module 270, that allows a user to identify failures from maintenance work order history for the selected asset/location, that have been previously received from the CM system 115, from a downtime tracking system, or other 3rd party failure database or spreadsheet. The user can use various filters to help pinpoint which work orders represent failures. Screen 430 shows the failures defined for an asset. The output of this step is to identify a failure condition. The table 431 in the user interface screen 430 includes a date to identify when failure events have occurred. The work orders received from the CM system 115 include the date and a failure code which identifies a failure such as a bearing failure, motor failure etc. The work order maintenance history is enumerated automatically. The heuristics 432 at the top of screen 430 includes ways to allow a user to identify work orders that include certain characteristics. A user can identify failures automatically using this method, but a user can also choose failures manually.

If the user does not have historical work orders for the asset, they can use the "offline status" feature to find past failures. By visualizing past offline conditions, the user can identify unplanned outages, and create a "virtual work order" in the asset failure detection system 110 to identify the failure event which was not properly documented in the CM system 115.

After identifying the failures at stage 1015, the process 1000 continues at stage 1020 where training data set importer module 320 retrieves a set of training data comprising sensor data corresponding to all the tags identified at stage 1005 that exhibit changes during the identified failures for the selected asset. The training data is filtered to remove outlier data, data when the asset is offline etc.

Figure 4H:
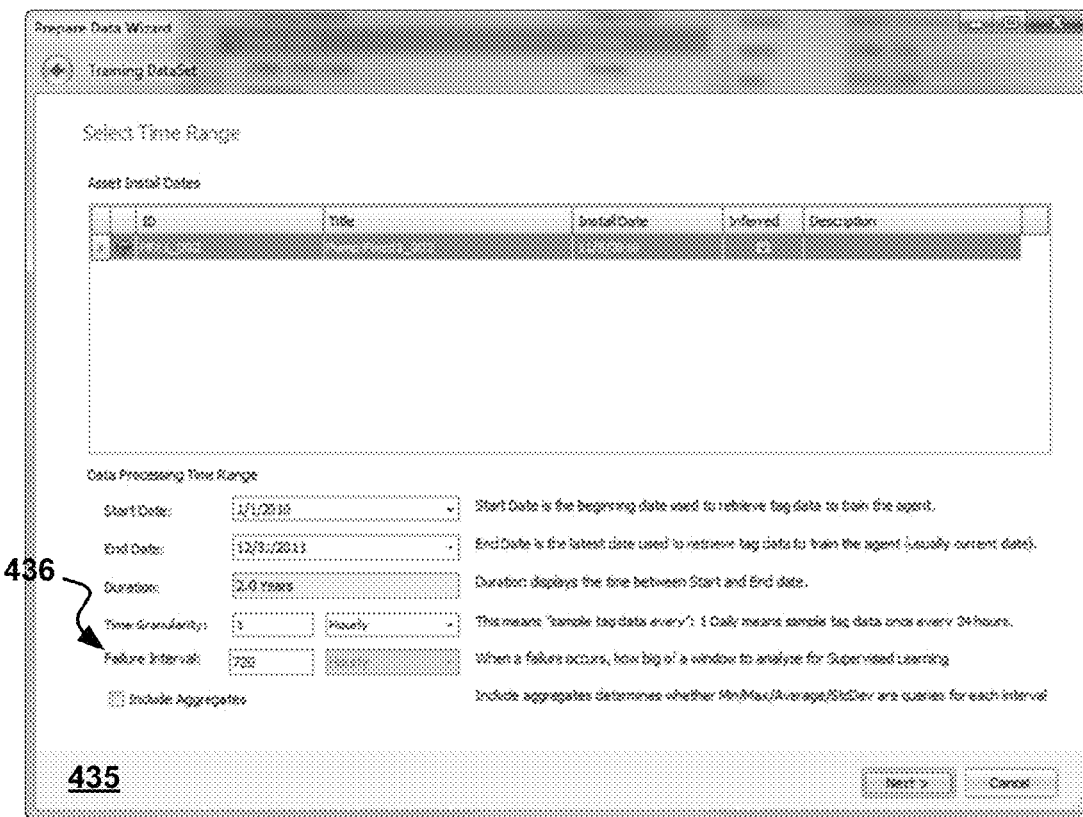

At stage 1020, the training set data importer module 320 displays screen 435 shown in FIG. 4H which allows the user to identify a set of training data to import. The training data can include data for any sensor that exhibits a change in condition at the time of the identified failure. A user can choose to include as much data as is available, or a user can choose to leave out certain times. The failure interval 436 (720 hours) shown in screen 435 allows a user to break the data into blocks for analysis. Once the time frame data is chosen, the user can choose to import the data to be analyzed.

Figure 4I:
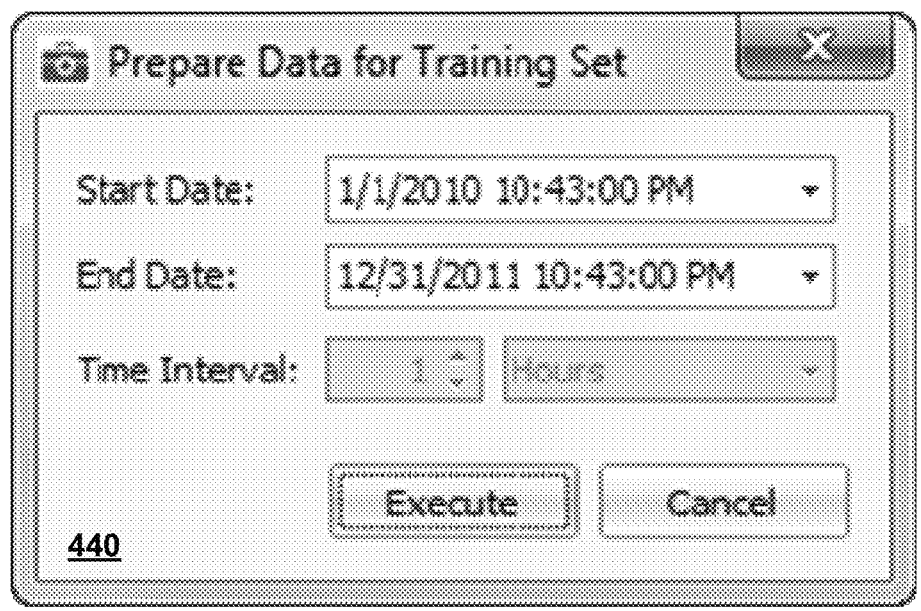
Figure 4J:
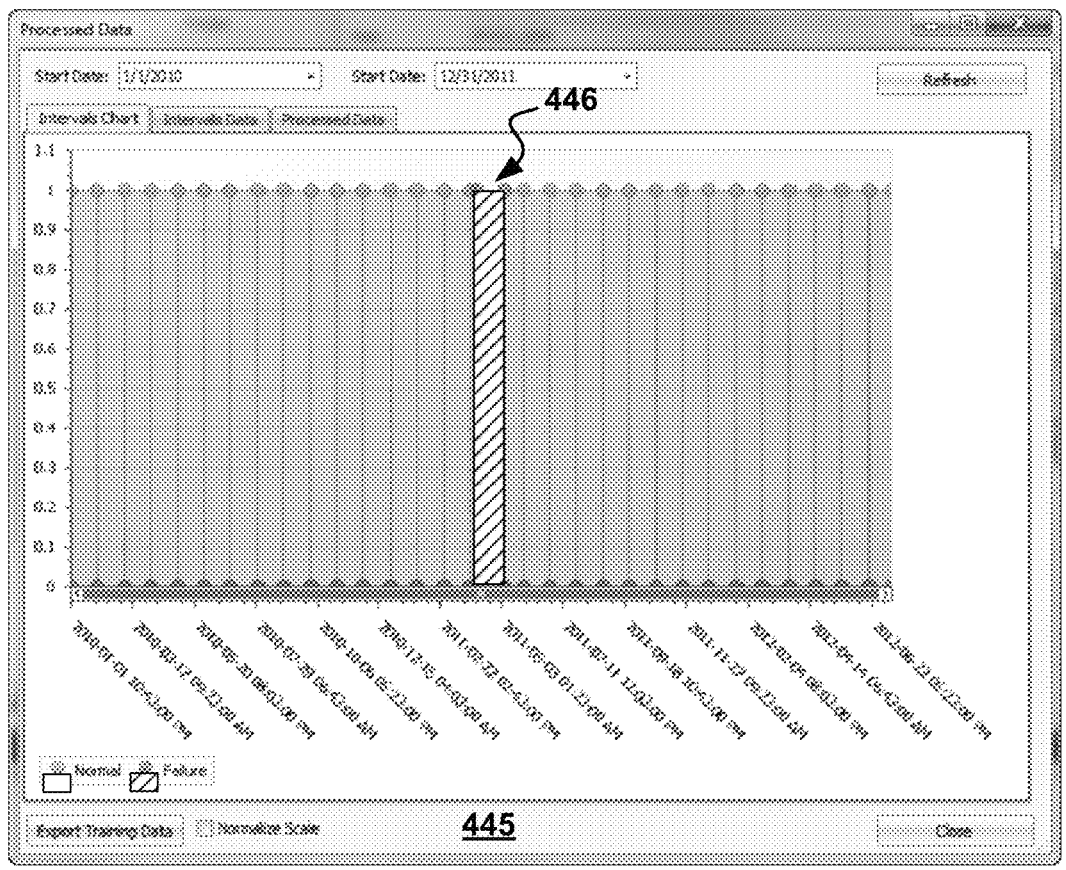

After the user inputs the data identifying which training data to import using the screen 435, the training data set importer module 320 displays a screen 440 shown in FIG. 4I which allows the user to verify the data to be imported. After the user selects to execute the import of the training data with the screen 440, the training data set importer module 320 displays a screen 445, as shown in FIG. 4J, that shows sensor data for normal conditions both before and after a portion 446 of training data that includes the identified failure. The procedures at stages 1005, 1010, 1014 and 1020 are repeated for many tags and many pieces of equipment matching the selected asset type until a large amount of data covering a long period of time for a large number of tags for each machine is obtained.

At stage 1020, data for all selected tags, as well as all selected failures is imported by the training data set importer module 320 and stored in optimized format for machine learning. Data Interpolation can be used to fill in missing tag data. The imported data is stored with metadata to flag which intervals are failure intervals versus normal intervals. The time interval leading up to failure for which data is most important is configurable based on a "prediction interval" specified for the Training Dataset (i.e. 30 days).

The user-specified "prediction interval" is a hint to the system as to a starting point for the learning algorithm employed at stage 1025. The learning algorithm automatically tunes the prediction interval by evaluating multiple interval durations, and selecting the one with the highest predictive accuracy for the past failure signatures.

At stage 1025, the learning agent training module 340 analyzes the sensor data at times leading up to and during the identified failures. The signature of a failure is a characteristic pattern of sensor readings, oscillations, some changing variable, etc. By identifying when a failure occurs for a given asset, the sensor data leading up to the failure and during the failure can be identified. Importing the sensor data leading up to and including a failure condition allows the failure signature recognition system to identify what leads up to the failure condition, not just the failure condition.

At stage 1025, one or more failure agents are created and trained using the imported training data set. Machine learning techniques such as Resilient Back Propagation (RPROP), Logistic Regression (LR), and Support Vector machines (SVM) can all be used at stage 1025. RPROP can be used for certain non-linear patterns, LR enables ranking of tag prediction rank, and SVM enables confidence intervals for predictions.

If multiple failures were identified in the training data set, separate failure agents can be trained for each fault. For example, one might be trained on a bearing failure, and another on a motor failure, which might have different signatures.

Figures 5, 6:
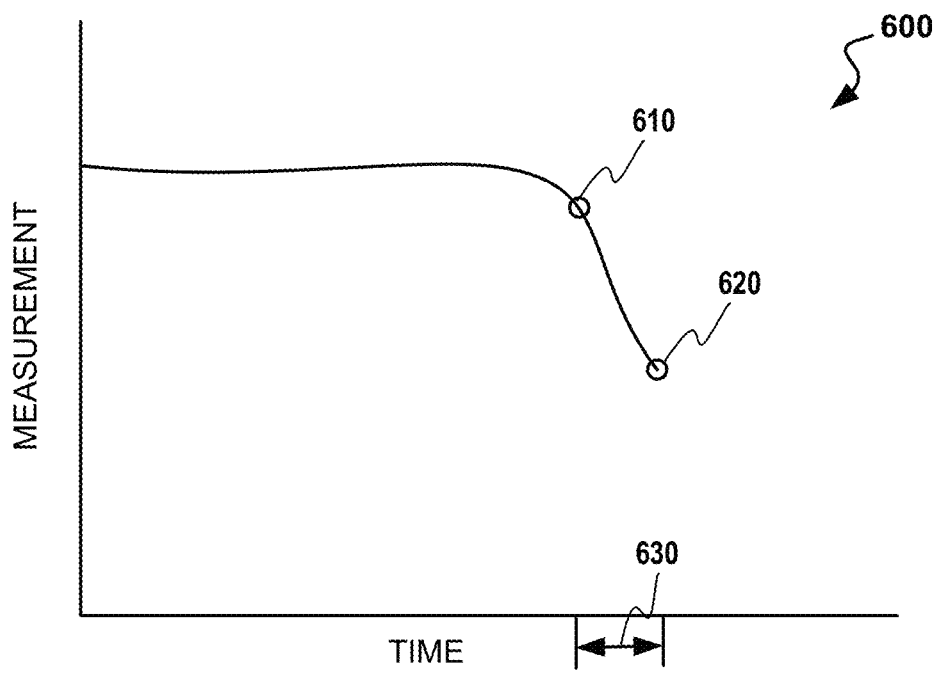
FIG. 5 illustrates possible successes and failures that can be experienced by a failure signature recognition system in accordance with the disclosure.
FIG. 6 depicts an exemplary time history used to tune a failure recognition system to provide a desired P-F interval between an identified potential failure condition and a resulting actual failure condition.

The training at stage 1025 involves creating a failure agent that takes in the sensor data in the training set and, using machine learning, parameters of the failure agent are adjusted such that the failure agent successfully predicts the identified failures before the failures occur. The training at stage 1025 can use a tuning methodology to avoid certain types of failures. FIG. 5 illustrates a failure space 500 illustrating the four types of results that a failure agent can experience. There are two types of successful predictions including a true negative 520 and a true positive 530. There are also two types of errors, type 1 is a false positive 540 and type 2 is a false negative 510. Type 2 errors can be catastrophic whereas type 1 errors can mean a little down time, but no loss of life. For example, the Deep Water Horizon oil rig disaster was a type 2 failure. Because of the difference in the result of type 1 and type 2 failures, the training at stage 1025 can be biased to avoid one type of error more than the other. For example, a user could weigh type 2 failures twice as much as type 1 failures for equipment where a false negative can be catastrophic such as an oil rig. In contrast, if type 2 failures do not result in loss of life, a user could weigh the type 1 failures to be more important.

At stage 1025, the user can configure the weightings if they do not agree with the numbers of each type of failure that occur for the training data set. The failure agent can be retrained after each new failure. The failure agent looks at all the sensor data brought in for each piece of equipment. The failure signature recognition training at stage 1025 can be accomplished with one sensor measurement and one failure or with hundreds of sensor measurements and hundreds of failures. Data from hundreds of pieces of equipment can help but are not necessary for adequate training at stage 1025.

In some cases where prediction models have already been trained, a technique known as transfer learning can be used to set default parameters for a starting point for training a new system. This saves time in developing the failure recognition agents for new systems. The learning agent training module 340 can use a failure agent that was trained for old equipment with more sensors than a new pump. In other words, the new pump has a subset of the sensors for an old type of pump. One can put flat line measurements for new sensors into an old agent and retrain the old agent by importing the new sensor data. For example, if you have a failure agent trained for two sensors and you add a new sensor, the learning agent training module 340 can retrain the old failure agent based on the new sensor data using flat lined past history for the new sensor. In other words, the learning agent training module 340 starts with the signature from the prior pump and recalibrates the old failure agent using the old signature and the new sensor data.

The training at stage 1025 can also tune a failure agent to achieve a maximum P-F (potential failure) interval which is an industry term for an advanced warning interval that a failure agent exhibits. The P-F interval is an average, or minimum time interval that a failure agent predicts a failure prior to the failure occurring. FIG. 6 illustrates a P-F interval.

FIG. 6 shows a graph 600 plotting a measurement against time. The measurement in the graph 600 can be an indication that the pump is going to fail, for example. The degradation in the measurement starts at point 610 (point P for potential failure) and the failure occurs at 620 (point F for failure). The system can give a warning of potential failure when the P point 610 is reached. The learning agent training module 340 can tune the failure agent to maximize the P-F interval. Thus, failure agents which give better P-F interval are favored over those that give smaller P-F intervals. Another thing that the learning agent training module 340 can tune for at stage 1025 is accuracy which can go from 0% to 100%. Two other measurements that can be used to tune a failure agent at stage 1025 are sensitivity and specificity. Sensitivity is the rate at which true positives (see section 520 in FIG. 5) occur. Specificity is rate at which true negatives occur. The overall accuracy can use 50/50 weightings of specificity and sensitivity, but the user can change these weights to give better accuracy for true negative or true positive.

In one embodiment, the training at stage 1025 first aims to arrive at a failure agent that gets as close as possible to 100% accuracy with the widest P-F interval. The next step can be to bias towards type 1 or type 2 failures, as determined by the user. A third step can be to tune the sensitivity (true positive rate) versus specificity (true negative rate). Thus, there are four rates to tune to, the rate of type 1 failures, the rate of type 2 failures, the specificity rate and the sensitivity rate. These rates can be tuned using a technique known as dynamic windowing as well as using another technique known as area under the curve (AUC) for calculating accuracy.

When the failure agent is trained on the training data set at stage 1025 using a dynamic windowing algorithm, the goal is to find the optimal prediction interval. Dynamic windowing is used to identify different prediction intervals, not just the thirty day default of screen 445. The learning agent training module 340 uses different spans of time to identify the optimal time interval using Receiver Operating Characteristic methodology and Area Under Curve (AUC) methodology. For example, the onset of a signature for a particular fault might be 10 days or 30 days. The algorithm will try different prediction intervals until it finds the one with the optimal fit using Receiver Operating Characteristic methodology and Area Under Curve (AUC) methodology.

The failure agent being trained at stage 1025 can also be tuned using different memory settings. A failure signature can be characterized as being a non-memory signature or a memory signature.

When dealing with time series data, there are two types of processes—"Markov" processes, which are memory-less, or non-Markov processes, which can have memory. The output of a Markov process at time N only depends on a function applied to the variables at time N, and nothing prior. A non Markov process has memory, so that the output at time N can depend on many past timestamps (N−1, N−2, N−3, . . . ). Markov processes are memoryless where all that matters is the current time step e.g., check engine soon light in car.

When analyzing a memory process or non-Markov process, one looks at the past readings for a period of time to sense the signature. Historyless (memoryless) processes, in contrast, are analyzed at each time period independently and the analysis tries to learn what is different in the failure period compared to the normal periods. As described below, one can vary the memory settings to get the optimum prediction interval.

As an example, if the memory setting is set to 1 hour, then it embodies a memory-less Markov process, where the output of the Agent only evaluates the sensor data from the current time step to output a result (Normal vs. Alarm). On the other hand if Memory setting is greater than 1 hour, i.e. 24 hours, then the output of the Agent depends on previous time steps in addition to the current time step.

If there is data from 10 tags in the current training data set, then, with no memory, the input to the machine learning agent would be a vector of length 10 for each time step. With a memory setting of 24 hours (and hourly granularity), the input would be a vector of length 24*10=240 for each time step, since the input would contain current data as well as prior data.

Figure 7:
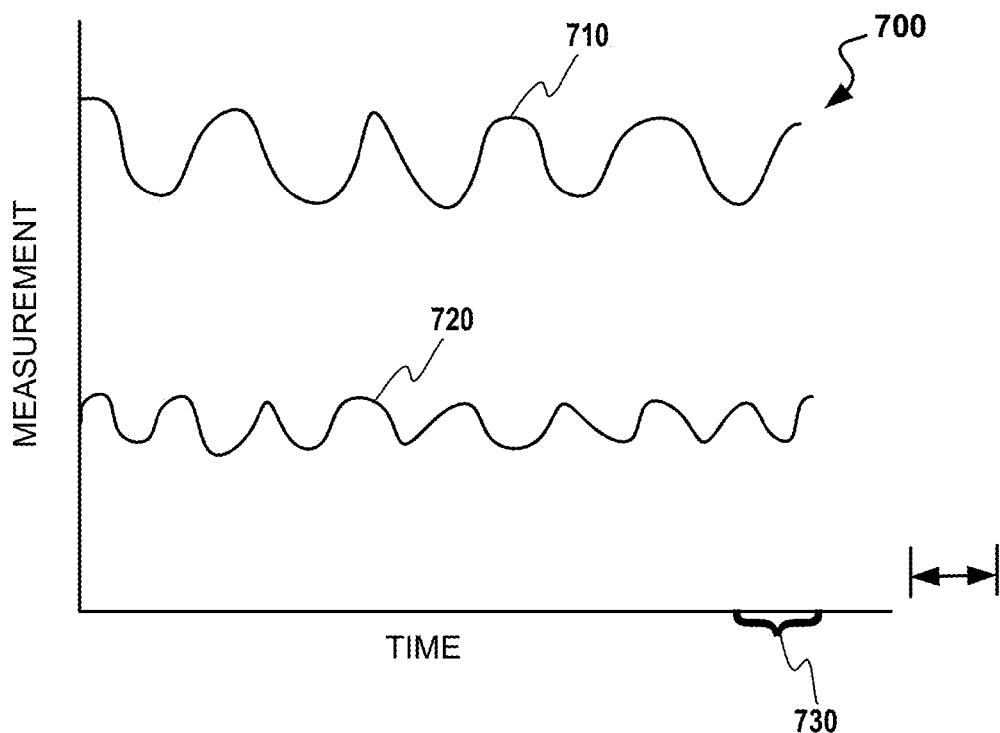
FIG. 7 illustrates a time history of a failure condition of two sensors exhibiting a failure condition that can be characterized by a non-memory type of learning agent.

FIG. 7 illustrates a failure signature that is a non-memory type failure. FIG. 7 shows a graph 700 a of a non-memory type failure for two sensors (e.g., pressure 710 and temperature 720). The failure signature of FIG. 7 is called a non-memory failure because there is very little change in the oscillation frequencies (or any characteristic) of the traces of the two sensors before, during or after the failure, which occurs in an interval 730 in FIG. 7. The input layer of the predictive model takes in these two inputs and predicts normal or failure (output=1 or =0). The number of inputs is the number of sensors. The analysis at stage 1025 takes a massive collection of these two element arrays and labels each as a failure or normal. This data is used to tweak the parameters of the predictive model to make the predictions. The non-memory takes into account only one measurement of each sensor (1 Temp and 1 Press) and trains the model. In contrast, a memory type system takes into account a series of measurements for each sensor.

Figure 8:
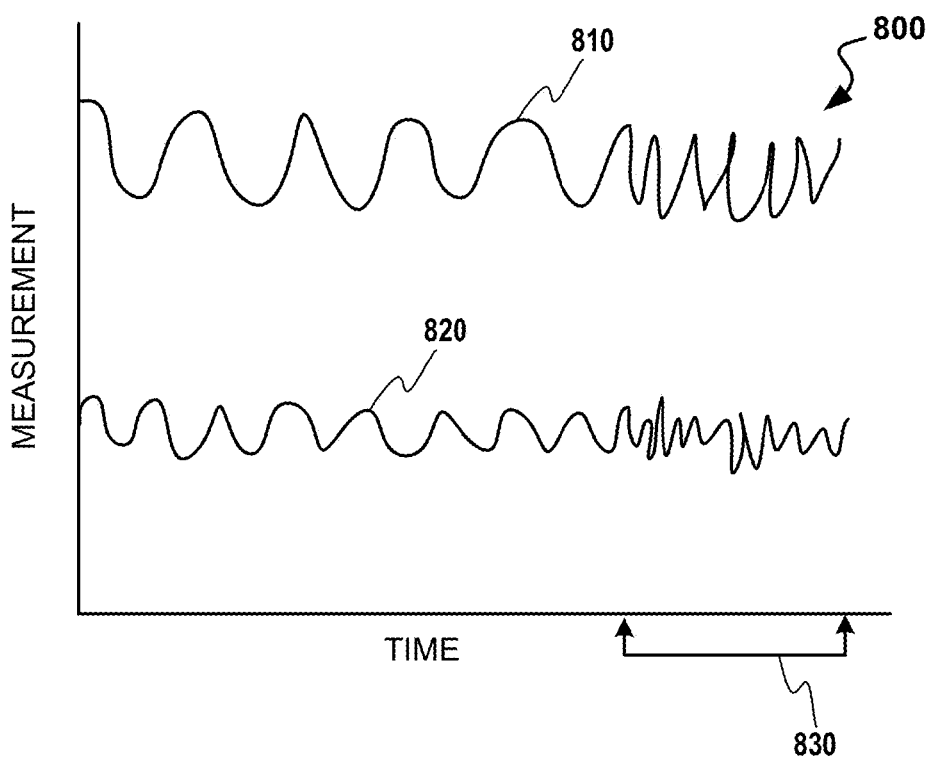
FIG. 8 illustrates a time history of a failure condition of two sensors exhibiting a failure condition that can be characterized by a memory type of learning agent.

FIG. 8 illustrates a memory type of failure signature. FIG. 8 shows a graph 800 including a first trace 810 and a second trace 820 from two different sensors. In this example of a failure signature with memory, the amplitude is about the same before and after the failure, but the frequency changes. For this reason, the failure may occur not just due to the amplitudes of the two measurements, but due to both the amplitude and frequency of oscillation, for example. In contrast, the non-memory example above only depends on the two measurements occurring at the same time.

At stage 1025, the learning agent training module 340 can tweak the memory interval to achieve the best accuracy. In addition, the learning agent training module 340 tweaks the window size and the memory interval. The memory size cannot be greater than the window size. The learning agent training module 340 further optimizes P-F interval and accuracy using area under the curve (accuracy) and picks the best agent. The results for the different memory intervals have an overall accuracy metric and a P-F interval metric. The learning agent training module 340 can tune between these two metrics. There is usually a maximum P-F interval. The chosen P-F interval could be the largest up to 4 weeks in one example. If one were to use a P-F interval of one year, for example, one would likely get spurious results.

Figure 4K:
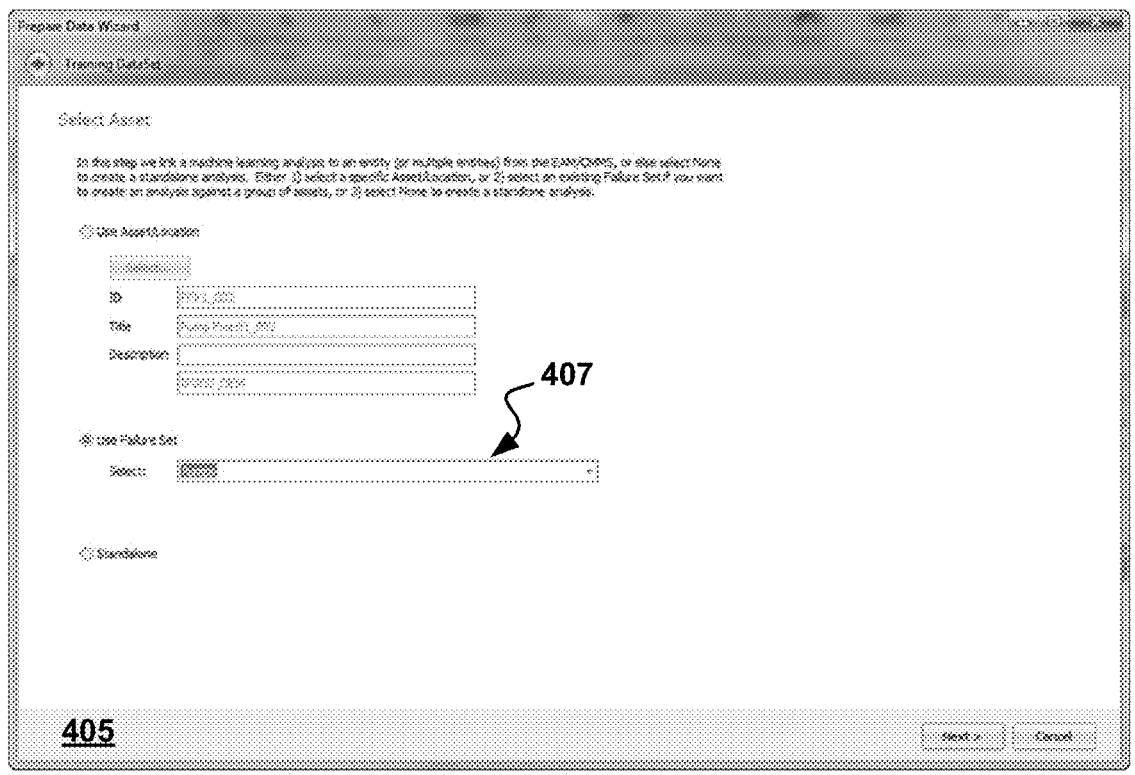

Population based learning uses populations of equipment as opposed to one type of equipment for one customer. As discussed above in reference to screen 405 of FIG. 4B, the user can select an existing Failure Set if the user wants to create an analysis against a group of assets. FIG. 4K shows the screen 405 where the user has selected to import a failure set 407 for a set of pumps. If one wants to train an agent over two or more pumps, the pumps should have the same sensor template (so as to compare apples to apples). The equipment type information is also important in selecting the group of assets. For example, one should separate centrifugal pumps from other types of pumps.

After the learning agent training module 340 has finished training the failure agent at stage 1025, the process 1000 continues at stage 1030 where the learning agent training module stores the failure agent in the failure/anomaly agent database 215.

The process 1000 is exemplary only and modifications to the process can be made without departing from the scope of the methods described herein. For example, stages may be omitted, added or rearranged.

Figure 11:
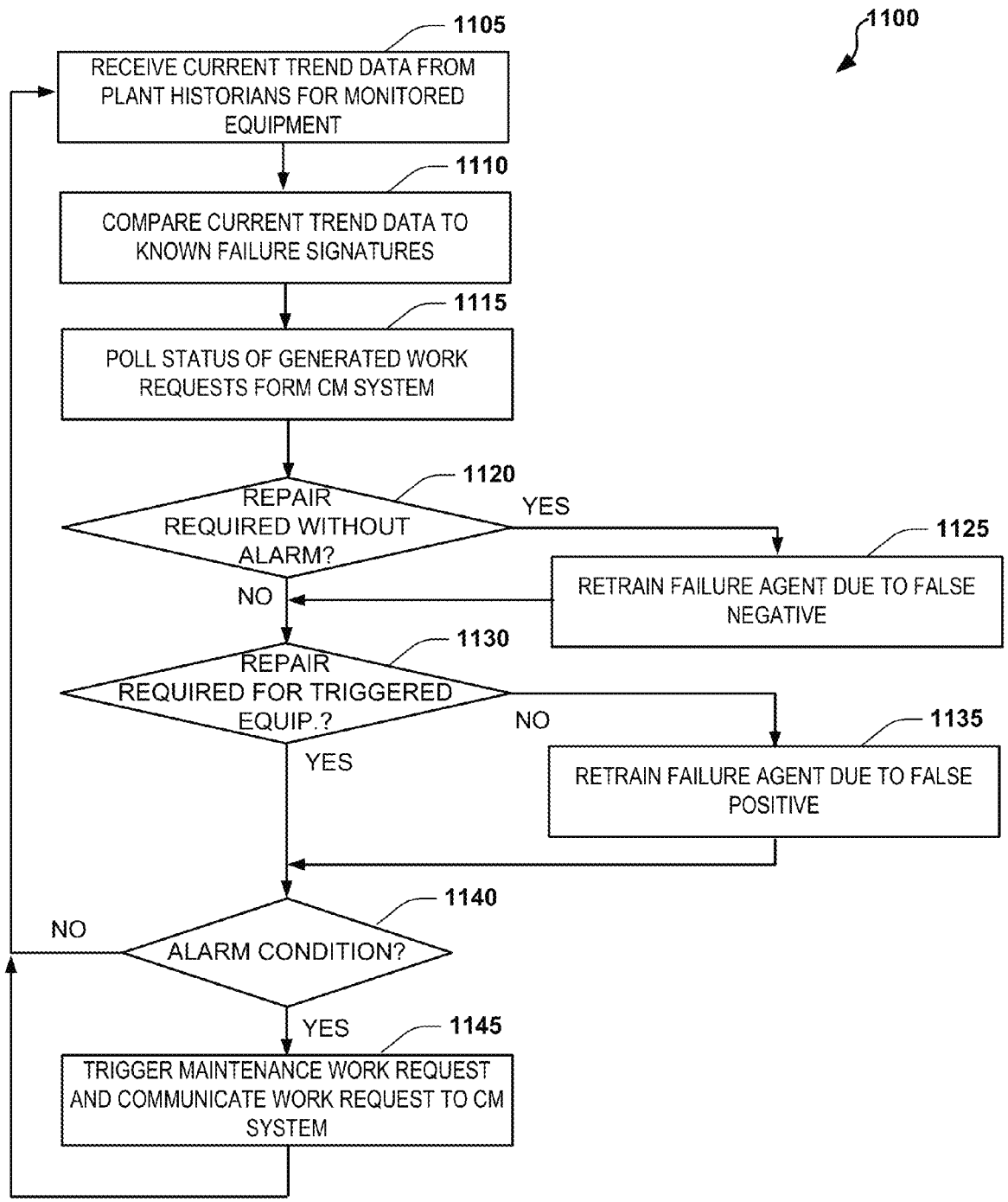
FIG. 11 illustrates a flowchart of an exemplary process for detecting failures and anomalies in accordance with the disclosure.

Referring now to FIG. 11, an exemplary process 1100 for detecting failures and anomalies in accordance with the disclosure includes the stages shown. The process 1100 can be performed by the failure signature recognition component 210 using, at least in part, the failure agents created using the process 1000 of FIG. 10. The process 1100 can be performed to monitor the first plant equipment 120-1 and the second plant equipment 120-2 based on sensor data received from the first plant data sources 130-1 and the second plant data sources 130-2, respectively. In addition, the process 1100 is used to detect false negatives and false positives and recalibrate the failure agents if necessary.

The process 1100 starts at stage 1105 where the failure signature recognition component 210 receives, via the plant data interface 240, current trend data from plant historians related to the plant data sources 130. The trend data includes data for all sensor tags that the user selected using the sensor templates in the process 1000 for each piece of monitored equipment.

At stage 1110, the failure signature recognition component 210 uses the failure agents in the failure/anomaly agent database to compare current trend data to known failure signatures.

At stage 1115, the CM system interface 230 polls the CM system 115 to request any new work orders that have been generated since the last polling. The CM system 115 provides the newly received work orders to the failure signature recognition component 210 and the failure signature recognition component 210 determines if any new repair orders have been generated. The CM system interface 230 polls the status of any work requests triggered by a failure agent alarm (see stag 1145) until the work request is cancelled or completed. Further, the CM system interface 230 tracks the case where the work request was converted into a work order in the CM system 115 with a different ID, then updates reference to the associated work order, and polls its status.

The process 1100 continues at stage 1120 where the failure signature recognition component 210 determines if any repair orders were generated to repair a failed piece of equipment without the failure signature recognition component 210 previously generating an alarm regarding the failed piece of equipment. This is done in order to determine if a false negative error has occurred. If the failure signature recognition component 210 determines at decision block 1120 that a false negative error has occurred, the process 1100 proceeds to stage 1125 where any failure agents that are associated with the failed piece of equipment are retrained. The retraining is done in a similar manner to the training discussed in reference to stage 1025 of the process 1000.

If the failure signature recognition component 210 determines that no false negative error has occurred at decision block 1120, the process 1100 continues to decision block 1130 where the failure signature recognition component 210 determines if a repair work order has been generated based on a previously triggered maintenance work request due to an alarm being triggered in the process 1100. If no work order requiring repair or indicating failure of the triggered equipment has been received at stage 1115 and if a threshold time has passed (e.g., 1 day), the process 1100 continues to stage 1135 where the failure signature recognition component 210 causes one or more failure agents to be retrained due to a false positive error. In other words, since an alarm was triggered, but the related piece of equipment did not fail or need any repair, this is indicative of a false positive and the associated failure agents should be retrained.

If, at decision block 1130, the failure signature recognition component 210 determines that a work order for repair has been generated for the piece of equipment that triggered the previous alarm, the process continues to decision block 1140.

At decision block 1140 the failure signature recognition component 210 determines if any of the failure agents, based on the comparisons of failure signatures performed at stage 1110, have indicated an alarm condition for any of the monitored equipment. If an alarm condition has not been indicated, the process continues back to stage 1105.

If the failure signature recognition component 210 determines that an alarm condition has been indicated by one or more of the failure agents, the process 1100 proceeds to stage 1145. At stage 1145, the failure signature recognition component 210 triggers creation of a maintenance work request, in one embodiment, and communicates the work request via the CM system interface 230 to the CM system 115. The work request identifies the piece of equipment that the alarm condition is related to as well as the sensor tags that contributed the most to the alarm condition being detected by one of the failure agents. After communicating the work request at stage 1145, the process 1100 continues back to stage 1105 to continue the previous stages.

Due to the retraining at stages 1125 and 1135, the process 1100 allows a failure agent to adapt itself over time, becoming more and more fine-tuned for the equipment it is monitoring. The process 1a00 is exemplary only and modifications to the process can be made without departing from the scope of the methods described herein. For example, stages may be omitted, added or rearranged.

Figure 12:
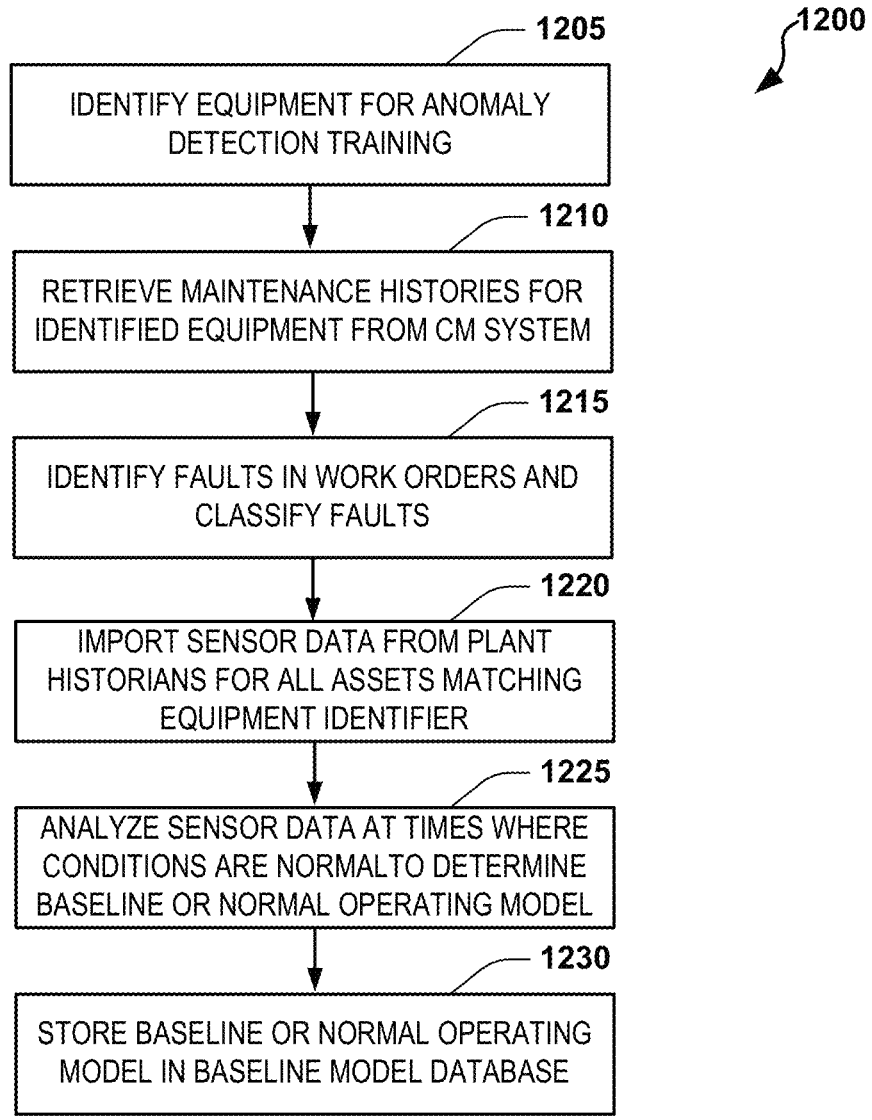
FIG. 12 illustrates a flowchart of an exemplary process for performing anomaly detection training in accordance with the disclosure.

Referring to FIG. 12, an exemplary process 1200 for performing anomaly detection training includes the stages shown. The anomaly detection training is similar to the failure signature recognition training of the process 1000. In contrast to looking for failure signature, the anomaly detection component 220 trains anomaly agents using the process 1200 to look for something that is neither normal nor a failure. If an anomaly agent detects something abnormal, the anomaly agent triggers a work order to be generated that indicates there was an anomaly. The failure signature recognition component 210 can apply the failure signature recognition process and the anomaly detection component 220 detects an anomaly. The anomaly detection component 220 identifies the tags that contributed most to the anomaly in a manner similar to failure signature recognition system in the process 1100.

At stage 1205, the user identifies equipment for the anomaly detection training. The procedure for identifying the equipment at stage 1205 is the same as the procedure at stage 1005 in the process 1000 discussed above. The anomaly detection component 220 can use the same functional modules included in the failure signature recognition component 210 shown in FIG. 3. The functions performed at the stages 1210, 1215 and 1220 are the same as those performed at stages 1010, 1015 and 1020 in the process 1000.

After performing the functions at the stages 1205 to 1220, the process 1200 continues at stage 1225 where the anomaly detection component 220 analyzes sensor data at times where conditions are normal in order to determine baseline or normal operating conditions. In one aspect, the anomaly detection component 220 utilizes a Kohonen self organizing map (SOM) to perform the analysis at stage 1225.

Figure 9:
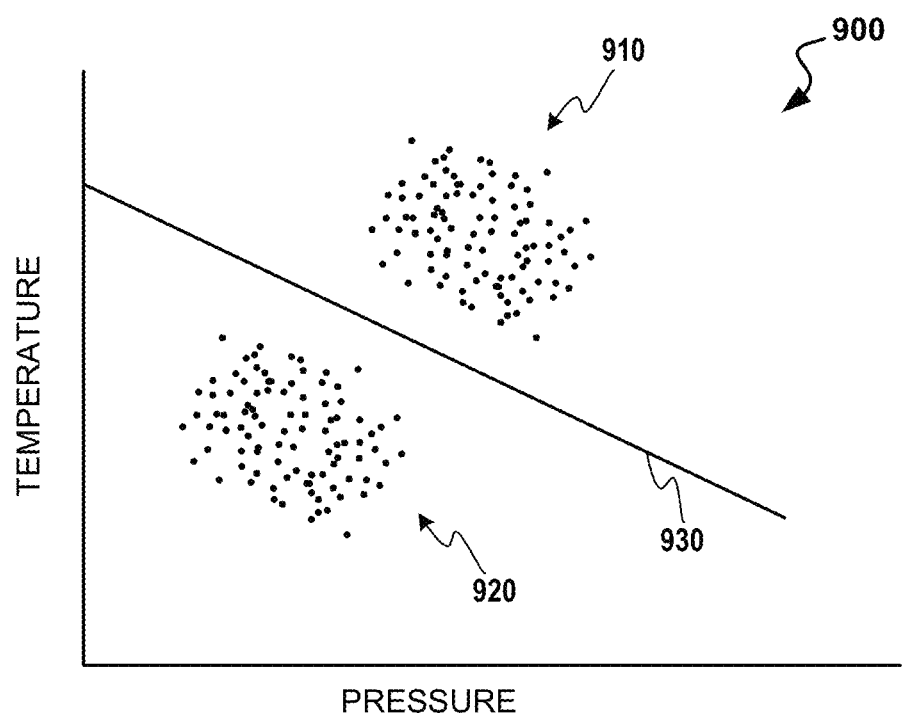
FIG. 9 illustrates a scatter diagram used in for unsupervised learning using self organized maps in accordance with the disclosure.

FIG. 9 shows a graph 900 that illustrates a SOM. The graph 900 plots temperature from a temperature sensor versus pressure from a pressure sensor. This situation is exemplary only. The normal condition shown in the graph 900 includes two areas. A first normal operating state is represented by a first group 910 of data points and a second normal operating state is represented by a second group 920 of data points. An anomaly agent is trained to detect an anomaly when the current operating state of a piece of equipment is outside of the first group 910 and the second group 920. The analysis at stage 1225 can comprise BIC (Bayesian Information Criteria) to determine the number of regions (e.g., the groups 910 and 920). Gausian probability can be used to determine the odds that sensor A (temperature) is one value and sensor B (pressure) is one value and this can detect the anomaly.

The Kohonen Self-Organizing Map (SOM) methodology essentially clusters tag data for each time step into an output, which can be thought of as an operating state. A Kohonen SOM with 4 outputs supports 4 operating states. The anomaly detection component 220 allows a user to specify an explicit number of output states if this information is known a priori about the equipment being monitored, or to automatically determine the optimal number of output states from the tag data using the Bayesian Information Criterion (BIC) as follows:

$$BIC(C|X) = L(X|C) - (p/2) * \log n \qquad (1)$$

Where X is the training data set, C is the anomaly agent model, p is the number of outputs (states) in the model, and n is the number of points in the training data set.

Once a given anomaly agent (with a given number of operating states) has been trained on the training data set at stage 1225, it is stored in the failure/anomaly agent database 215 at stage 1230 and the anomaly agent is activated as a live profile for monitoring. The anomaly agents can monitor the new sensor data during the process 1100 in the same way that the failure agents monitor the new sensor data. The Agent feeds the new data into the trained SOM model, which classifies it into one of the known operating states, and returns the output state along with the classification error E.

The way Anomaly Detection works is, it compares the error E of the current classification to the maximum error detected on the Training DataSet, E'. If E exceeds E' by a factor T, known as the Anomaly Threshold, then an Anomaly Alert is generated. Whenever an Anomaly is detected and determined to be a valid predictor of a fault, a supervised learning profile (Failure Signature Recognition) agent is created to learn the specifics of the new signature, and flagged with extra metadata about the specifics of the fault and remedy. In this format, the system goes from anomalies to failure signatures (with improved recommended corrective action).

In addition to the Kohonen SOM methodology, a second training methodology that can be used at stage 1225 uses Gaussian probabilities. Unlike SOM, the Gaussian probabilistic algorithm is not based on a model parameterized by a number of operating states. The Gaussian algorithm fits a probability distribution to each tag (variable) in the Training DataSet, estimating the mean μ and standard deviation a from the data. With these parameters estimated, the Gaussian probability function is used for each tag as follows:

$$f(x) = \frac{1}{\sigma\sqrt{2\pi}} e^{-\{z-\mu)^2/(2\sigma^2)} \qquad (2)$$

For a given time step, the value for each tag Xi is fed into the Gaussian function for that tag (with the associated mean and standard deviation), and the probability is calculated.

After the probability is calculated for each tag for a given time step, these probabilities are multiplied together to get the overall probability (based on assumption of independence of the random variables for each tag). The probability (P, returned by f(x)) is compared to the minimum baseline probability calculated from the Training DataSet (P'). If P is smaller than P' by a factor T, known as the Anomaly Threshold, then the new tag data is considered to be an anomaly, and an Anomaly Alert is generated.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

In conclusion, embodiments in accordance with the disclosure provide, among other things, a system and method for automatic failure detection and anomaly detection. Those skilled in the art can readily recognize that numerous variations and substitutions may be made in the disclosed embodiments, their use and their configuration to achieve substantially the same results as achieved by the embodiments described herein. Accordingly, there is no intention to limit the claims to the disclosed exemplary forms. Many variations, modifications and alternative constructions fall within the scope and spirit of the disclosure as expressed in the claims.

What is claimed is:

1. A system for performing failure signature recognition training for at least one unit of equipment, the system comprising:
   memory;
   a network interface configured to:
   receive a sensor data signal including sensor data relating to the unit of equipment;
   receive a failure information signal including failure information relating to equipment failures; and
   one or more processors in communication with the memory and the network interface, the one or more processors being configured by computer code to analyze the sensor data in view of the failure information in order to develop at least one learning agent for performing failure signature recognition with respect to the at least one unit of equipment wherein machine learning is used during a training phase to adjust parameters of the failure agent to successfully predict failures identified by the failure information and to bias the parameters to avoid at least one of false positive errors and false negative errors wherein the one or more processors are further configured by the computer code to store the sensor data within a memory wherein the sensor data covers a plurality of intervals and is stored along with metadata to flag ones of the plurality of intervals associated with failure intervals and ones of the plurality of intervals associated with normal intervals.

2. The system of claim 1 wherein the failure information relates to prior failures of the at least one unit of equipment.

3. The system of claim 1 wherein the failure information relates to prior failures of other equipment different from the at least one unit of equipment, the other equipment being functionally similar to the at least one unit of equipment.

4. The system of claim 1 wherein the failure information includes indications types, dates and codes associated with the equipment failures.

5. The system of claim 1 wherein the one or more processors are further configured by the computer code to receive an input identifying the at least one piece of equipment.

6. The system of claim 5 wherein the input identifies only the at least one unit of equipment.

7. The system of claim 5 wherein the input identifies a group of equipment including the unit of equipment.

8. The system of claim 5 wherein the input identifies a plurality of tags respectively corresponding to a plurality of sensors associated with the unit of equipment.

9. The system of claim 8 wherein the input further identifies at least one of minimum and maximum outlier removal settings for one or more of the plurality of sensors.

10. The system of claim 1 wherein the failure information includes indications of the equipment failures.

11. The system of claim 1 wherein the failure information comprises work order information, the one or more processors being further configured to identify faults in the work order information corresponding to the equipment failures and to classify the faults.

12. The system of claim 1 wherein the one or more processors are further configured by the computer code to analyze the sensor data at times of the one or more equipment failures in order to learn one or more fault signatures.

13. The system of claim 1 wherein the network interface is further configured to receive an additional sensor data signal including additional sensor data relating to an additional unit of equipment and to receive an additional failure information signal including additional failure information relating to one or more additional equipment failures;
wherein the one or more processors are further configured by the computer code to analyze the additional sensor data in view of the one or more additional equipment failures to learn one or more additional fault signatures.

14. The system of claim 13 wherein the one or more processors are further configured by the computer code to store the one or more additional fault signatures within the memory.

15. A system for performing operations relating to anomaly detection for at least one unit of equipment, the system comprising:
a memory;
a network interface configured to:
receive a sensor data signal including sensor data relating to the unit of equipment;
receive a failure information signal including failure information relating to one or more equipment failures;
one or more processors coupled to the memory, the one or more processors being configured by computer code to:
analyze the sensor data over time periods other than periods encompassing the one or more equipment failures to determine one or more normal operating states of the at least one unit of equipment;
train an anomaly agent to detect an anomaly when a current operating state of the at least one unit of equipment is outside of the one or more normal operating states wherein the anomaly agent utilizes one of a self-organizing map and a Restricted Boltzman Machine (RBM) to model the one or more normal operating states;
activate the anomaly agent to monitor additional sensor data relating to the unit of equipment;
provide the additional sensor data to the self-organizing map;
perform a comparison of an error associated with a classification of the additional sensor data by the self-organizing map to a maximum error; and
detect an anomaly condition based upon the comparison.

16. The system of claim 15 wherein the anomaly agent utilizes Gaussian probabilities to model the one or more normal operating states.

17. A system for performing failure signature recognition training for at least one unit of equipment, the system comprising:
memory;
a network interface configured to:
receive a sensor data signal including sensor data relating to the unit of equipment
receive a failure information signal including failure information relating to equipment failures; and
one or more processors in communication with the memory and the network interface, the one or more processors being configured by computer code to analyze the sensor data in view of the failure information in order to develop at least one learning agent for performing failure signature recognition with respect to the at least one unit of equipment wherein machine learning is used during a training phase to adjust parameters of the failure agent to successfully predict failures identified by the failure information and to bias the parameters to avoid at least one of false positive errors and false negative errors wherein the one or more processors are further configured by the computer code to tune a prediction interval over which the sensor data is evaluated by evaluating failure prediction accuracy over multiple interval durations.

18. A system for performing failure signature recognition training for at least one unit of equipment, the system comprising:
memory;
a network interface configured to:
receive a sensor data signal including sensor data relating to the unit of equipment;
receive a failure information signal including failure information relating to equipment failures; and
one or more processors in communication with the memory and the network interface, the one or more processors being configured by computer code to analyze the sensor data in view of the failure information in order to develop at least one learning agent for performing failure signature recognition with respect to the at least one unit of equipment wherein machine learning is used during a training phase to adjust parameters of the failure agent to achieve a desired potential failure to failure (P-F) interval.

19. The system of claim 18 wherein the desired P-F interval is a widest P-F interval that may be obtained in view of a desired level of failure prediction accuracy.

20. The system of claim 18 wherein the one or more processors are further configured by the computer code to bias the parameters to avoid at least one of false positive errors and false negative errors.

* * * * *